United States Patent [19]

Kennedy et al.

[11] Patent Number: 4,758,631

[45] Date of Patent: Jul. 19, 1988

[54] METHOD OF PREPARING ALLYL-TERMINATED POLYISOBUTYLENE

[75] Inventors: Joseph P. Kennedy, Akron, Ohio; Donald R. Weyenberg, Midland, Mich.; Lech Wilczek, Akron, Ohio; Antony P. Wright, Rhodes, Mich.

[73] Assignee: Dow Corning Corporation, Midland, Mich.

[21] Appl. No.: 919,529

[22] Filed: Oct. 16, 1986

[51] Int. Cl.[4] ........................................... C08F 275/00
[52] U.S. Cl. ..................................... 525/245; 525/249; 525/251; 525/288
[58] Field of Search ................. 525/245, 249, 251, 288

[56] References Cited

U.S. PATENT DOCUMENTS

| | | | |
|---|---|---|---|
| 3,830,872 | 8/1974 | Schrage et al. | 525/248 |
| 4,276,394 | 6/1981 | Kennedy et al. | 525/245 |
| 4,342,849 | 8/1982 | Kennedy | 525/333.7 |
| 4,529,778 | 7/1985 | Shannon | 525/288 |
| 4,532,061 | 7/1985 | Loveless et al. | 525/288 |
| 4,593,071 | 6/1986 | Keogh | 525/288 |
| 4,661,552 | 4/1987 | Kallenbach | 525/288 |

*Primary Examiner*—Joseph L. Schofer
*Assistant Examiner*—Bernard Lipman
*Attorney, Agent, or Firm*—James E. Bittell

[57] ABSTRACT

The invention relates to a method of preparing allyl-terminated polyisobutylene (PIB) by allylation with allyltrimethylsilane of tertiary chloro-capped PIB by electrophilic substitution. The synthesis begins with the $BCl_3$, catalyzed mono- or oligo-tertiary chloride "inifer" initiated polymerization of isobutylene, followed in the same reaction vessel by the addition of hexane, allyltrimethylsilane, and $TiCl_4$.

19 Claims, No Drawings

METHOD OF PREPARING ALLYL-TERMINATED POLYISOBUTYLENE

BACKGROUND OF THE INVENTION

During the last two decades a variety of organosilicon compounds have been shown to react with various electrophilic reagents. Reactions may occur with organosilicon compounds containing multiple bonds which are one, two or three atoms removed from silicon, i.e., with arylsilanes, vinylsilanes, alkynylsilanes, silyl enol ethers, allylsilanes, benzylsilanes, homoallylsilanes and under vigorous conditions also with alkylsilanes. Most of these reactions are envisioned to proceed by electrophilic attack leading to an intermediate cation beta to silicon. Such reactions are highly regioselective due to cation stabilization. The silyl group is usually lost during subsequent steps leading to compounds having the electrophile and the multiple bond in predictable locations.

Electrophilic substitution of organosilicon compounds is one of the least explored synthetic techniques in polymer synthesis. Due to the relatively weakly polarized silicon-carbon bond organosilanes behave as weakly reactive organometallic compounds. Thus they can be handled more conveniently than other organometals, i.e., they do not usually require anhydrous or inert atmospheres and are inert in the presence of a great variety of functional groups. Little work has been done on electrophilic substitution of organosilicon compounds with carbocations or species bearing a relatively high positive charge on the carbon atom. Adamantyl and tert-butyl halides have been demonstrated to undergo substitution in the presence of Lewis acids with select unsaturated organosilicon compounds. (See for example, I. Fleming, et al. Synthesis, 1979, 446; T. Sasaki, et al., J. Org. Chem., 1980(45), 3559.)

Polyisobutylene has limited utility because it is hard to crosslink. Copolymerization with small amounts of isoprene was found to give residual sites of unsaturation which thus permitted sulfur vulcanization, resulting in the commercialization of butyl rubber during World War II. Besides chemical and ozone inertness, butyl rubber has very low permeability to gases and has thus found widespread use in tire inner tubes. Low molecular weight polyisobutylene oils are currently used to increase the viscosity of lubricating oils, and the higher molecular weight unvulcanized polymer is used in adhesives, caulks, sealants, and polymer additives.

Copolymerization of polyisobutylene with polydialkylsiloxanes, so-called silicones, would produce desirable materials. Surprisingly, very little work has been done with soft block-soft block copolymers of polydimethylsiloxane (PDMS) with either polyisobutylene or other organic polymers that are above their glass transition and crystal melting temperatures at ambient temperature. Such copolymers are expected to be fluid materials. PDMS polybutadiene soft block-soft block copolymers of comb structure are known but do not have the ozone and yellowing resistance that a PIB silicone block copolymer would have.

A simple way to join a polydimethylsiloxane polymer to an organic polymer to form a block copolymer is through the hydrosilylation reaction which involves the platinum catalyzed addition of an SiH moiety to most preferably a terminal olefin, $H_2C=CHR$, to give $SiCH_2CH_2R$.

Industrially, isobutylene is polymerized with aluminum chloride at reaction temperatures as low as −100 degrees Centigrade. The product has mostly saturated aliphatic end groups.

Polyisobutylene (PIB) containing sites of unsaturation can be produced by copolymerization of isobutylene with small amounts of isoprene. The resulting unsaturation permits vulcanization, but because the sites are mainly internal, hydrosilylation is inhibited or prevented. Terminal olefinic end groups on one end can be obtained by initiating polymerization with $BCl_3$, and $CH_2=CHC(CH_3)_2Cl$, but not with allyl chloride. The other end of the macromolecule will be chloride ended. Although the $CH_2=CHC(CH_3)_2-$ group is terminal, it is still not very reactive in hydrosilylation due to the steric hinderance provided by the two methyl groups. In addition, only an (AB) block copolymer may form, where A represents the siloxane block and B represents the hydrocarbon block. Another approach has been to make a polymer with chlorine at each end by using a special dichlorocarbon coinitiator such as para dicumyl chloride with $BCl_3$, or by using chlorine as a coinitiator. The chlorine terminated polymer is then dehydrohalogenated to form the $-CH_2-C(CH_3)=CH_2$ group by refluxing 20 hours with potassium tertiary butoxide, cooling, water washing three times, and drying. (See U.S. Pat. No. 4,342,849, issued Aug. 3, 1982 to Kennedy). This terminally unsaturated PIB can slowly undergo hydrosilylation. Hydrosilylation is slow because the end group is sterically hindered. Thus there exists a need for a fast, simple and inexpensive method to provide unhindered allylic, $CH_2=CHCH_2-$, terminal functionality on PIB to produce polymers such as $CH_2=CHCH_2-PIB-CH_2CH=CH_2$ which can undergo rapid hydrosilylation at both ends to form an $(AB)_x$ block copolymer where x is greater than two. Such materials are useful in many applications, including use as electronic potting gels, surfactants to compatibilize PIB with silicones, pressure sensitive adhesives and as non-stick chewing gum.

SUMMARY OF THE INVENTION

The present invention relates to a method of preparing allyl-terminated polyisobutylene (PIB) by allylation with allyltrimethylsilane of tertiary chloro-capped PIB by electrophilic substitution. The synthesis is the first example of the use of the silyl synthon allyltrimethylsilane in polymer chemistry. The synthesis begins with the $BCl_3$ catalyzed mono- or oligo-tertiary-chloride "inifer" initiated polymerization of isobutylene, followed in the same reaction vessel by the addition of hexane allyltrimethylsilane and $TiCl_4$. By this method is produced allyl terminated PIB.

DETAILED DESCRIPTION OF THE INVENTION

The present invention is directed toward a process for the synthesis of novel telechelic, or terminally functional polymers such as polyisobutylenes carrying terminal unsaturations such as allylic groups. To practice the process of the present invention it is first necessary to begin with a chlorine functional or chlorine/olefin mixed functional telechelic isobutylene which, in turn, involves polymerization of the monomer and a multifunctional compound capable of simultaneously initiating polymerization and acting as a transfer agent. For this compound, the term inifer has been employed, derived from the words initiator and transfer. The inifer is generally a mono or an oligotertiary organic chloride, such as $(ClC(CH_3)_2C)_xC_6H_{(6-x)}$ where $x=1$, 2 or 3, or the inifer is a chloro olefin such as $H_2C{=}CH(CH_3)_2CCl$.

It is therefore an object of the present invention to provide novel telechelic allyl-terminated polyisobutylene polymers. It is another object of the present invention to provide a process for the synthesis of polyisobutylenes carrying terminal sites of allylic unsaturation. The invention relates to a method of preparing in a one reaction vessel two step process allyl-terminated PIB by the allylation with allyltrimethylsilane of tertiary chloro end-capped PIB by electrophilic substitution. By "tertiary chloro end-capped PIB" or "tertiary chlorinated polyisobutylene" in the present invention is meant polyisobutylene molecules having at least one tertiary carbon atom to which is bonded a chlorine atom. The invention further relates to a procedure in which a prepolymer of PIB is prepared from isobutylene (IB) by the inifer method in the presence of $BCl_3$ and inifer. The reaction mixture resulting from polymerizing the IB to PIB is not quenched but instead an excess of a mixture of allyltrimethylsilane and a Friedel-Crafts type Lewis acid catalyst, preferably $TiCl_4$, is added. A three fold molar excess of $BCl_3$ remaining from the IB polymerization, relative to the tertiary chloro end groups completely destroys the allylation activity of $Et_2AlCl$ and significantly reduced that of $SnCl_4$. In contrast, the allylation efficiency of $TiCl_4$ is not adversely affected by the presence of $BCl_3$ according to the instant invention. Low molecular weight ($M_n=1,000$ to 4,000) PIBs prepared with $BCl_3$, and dicumyl chloride inifer may contain 10–30% monoreacted termini which in the presence of Lewis acids may undergo intramolecular cycloalkylation leading to indanyl end groups. However, by the present invention, complete terminal allylation and absence of indanyl end group formation was achieved using a 2-3 fold stoichiometric excess of allyltrimethylsilane and $TiCl_4$ relative to tertiary chloro end-capped groups. By this method can be isolated an allyl-terminated PIB polymer.

The use of alternative metal halides and metal complexes is included in the scope of the instant invention. Other Friedel-Crafts type Lewis acid metal catalysts operative in the instant invention include, but are not limited to, zirconium halides, vanadium halides, iron halides and complexes; aluminum halides and aluminum alkyl halides.

In addition, the instant invention relates to a method of preparing allyl-terminated polyisobutylene polymer which method comprises reacting tertiary chlorinated polyisobutylene with allyltrimethylsilane in the presence of boron trichloride and titanium tetrachloride, tin tetrachloride, or, in the absence of boron trichloride, dialkyl aluminum chloride, such as but not limited to diethyl aluminum chloride, whereby allyl-terminated polyisobutylene polymer is produced. Alkyl aluminum chlorides with alkyl groups of one to six carbon atoms are also operative in the instant invention.

Included in the scope of the instant invention is the allylation of polyisobutylene with substituted allylsilanes of the formula $R^2_3SiCH_2CR^3CH_2$ wherein $R^2$ and $R^3$ are independently selected from the group consisting of hydrogen and alkyl groups containing one to six carbon atoms.

The instant invention further relates to a method of preparing allyl-terminated polyisobutylene polymer which method comprises (A) polymerizing isobutylene in a methyl chloride and hexane mixture, and in the presence of boron trichloride and an inifer wherein said inifer is selected from compounds having the following formula: $AY_n$, where A is selected from the group consisting of condensed and non-condensed aromatic compounds having from 1 to 4 rings, and linear and branched aliphatic compounds having from 3 to 20 carbon atoms, where Y is represented by the following formula:

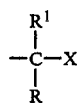

where R and $R^1$ are independently selected from the group consisting of alkyl and aryl, and where X is a halogen selected from the group consisting of chlorine and bromine, and where n is an integer from 1 to 6;

(B) increasing the hexane concentration of the reaction mixture to improve solubility of the polymer;

(C) allylating the polyisobutylene by adding an allyl-functional silane and titanium tetrachloride to the reaction mixture, wherein the allyl-functional silane is selected from the group consisting of compounds having the following formula $$R^2_3SiCH_2CR^3CH_2$$

wherein $R^2$ and $R^3$ are independently selected from the group consisting of hydrogen and alkyl groups containing one to six carbon atoms;

(D) allowing the allylation reaction to proceed to completion;

(E) pouring the reaction mixture into an aqueous basic solution and, (F) isolating and purifying the allyl-terminated polyisobutylene polymer.

By "completion" of the allylation herein is meant continuation of the allylation reaction until such time as a major portion of the PIB has been allylated.

The efficiency of the Friedel-Crafts Lewis acids toward allylation of 2,4,4-trimethyl-2-chloropentane (TMP-Cl), which models the allylation of tertiary chlorinated polyisobutylene, was found to decrease in the following order: $(CH_3CH_2)_2AlCl > TiCl_4 > SnCl_4 >> BCl_3$. Differences in the catalytic activities of Friedel-Crafts Lewis acids increased as the reaction temperature was increased. Decreasing the temperature from 20 degrees to $-70$ degrees Centigrade improved the yields. At $-70$ Centigrade allylation was quantitative in the presence of $(CH_3CH_2)_2AlCl$, or $TiCl_4$, or $SnCl_4$ using a two-fold molar excess of allyltrimethylsilane relative to tertiary chloro end-capped groups. The extent of ionization by the Friedel-Crafts Lewis acid appears to govern substitution yield. $TiCl_4$ has been found by the present invention to be the most efficient allylation catalyst for tertiary chlorinated polyisobutylene in the presence of $BCl_3$. Although diethylaluminum chloride was slightly more efficient than $TiCl_4$ in the absence of $BCl_3$, it was inactive in the presence of $BCl_3$.

A dramatic solvent effect in the electrophilic catalyzed reaction of allyltrimethylsilane with TMP-Cl has also been observed. The polarity of the medium was varied by the use of $CH_2Cl_2$, mixtures of $CH_2Cl_2$ and hexane, and pure hexane. For the case of the model compound TMP-Cl, in pure hexane, allylation is strongly suppressed while in the presence of approximately 30% CH$_2$Cl$_2$ 70% hexane or in pure CH$_2$Cl$_2$ allylation efficiency is very high. In the allylation of tertiary chlorinated polyisobutylene, the CH$_2$Cl$_2$ content cannot be significantly over 45 weight % or else precipitation of the polymer begins to occur. A preferred embodiment, therefore, of the present invention is the "one reaction vessel two step" allylation of PIB in which the reaction medium mixture of approximately 80% methyl chloride/20% hexane used to polymerize the IB to PIB, is changed by adding hexane to be approximately 45:55 CH$_3$Cl:hexane. Another preferred embodiment of the present invention is the "two reaction vessel two step" allylation of PIB wherein the 80% methyl chloride/20% hexane mixture used for the polymerization of IB to PIB is replaced in the second step with a solvent composition of 45:55 CH$_2$Cl$_2$:hexane. The hexane concentration can thus be increased to a concentration in the range of 55 to 70 weight per cent.

Materials

Diethylaluminum chloride ((CH$_3$CH$_2$)$_2$AlCl) was obtained from Ethyl Corporation, Baton Rouge, La. Boron trichloride (BCl$_3$) was obtained from Union Carbide Company, Danbury, Conn. Titanium chloride (TiCl$_4$) was obtained from Aldrich Company, Milwaukee, Wis. Tin chloride (SnCl$_4$) was obtained from Fisher Company, Pittsburgh, Pa. Allyltrimethylsilane was obtained from Petrarch Systems Inc., Bristol, Pa. Chloro PIB was prepared by the semicontinuous inifer method of Kennedy et al. (J. Polym. Sci., Polm. Chem. Ed., 18, 1523 1980).

EXAMPLE 1

"One Reaction Vessel Two Step" Allylation of Chloro PIB

Isobutylene (0.0224 moles) was polymerized at −80 degrees Centigrade for 60 minutes by passing it into 25 milliliters of a 80 parts methyl chloride and 20 parts hexane solution of 0.000281 moles of para-dicumyl chloride, 0.00154 moles BCl$_3$, in a culture tube. After one hour, the solvent composition was changed by adding hexane to be 45:55 CH$_3$Cl:hexane. The reaction was not quenched, but rather about two fold molar excesses (relative to the tertiary chloro groups of the cumyl chloride) of allyltrimethylsilane (0.00109 moles) and TiCl$_4$ (0.000702 moles) were simultaneously added at −80 degrees Centigrade. After 60 minutes the system was poured into a solution of saturated NaHCO$_3$ at 0 degrees Centigrade. The allylated polymer was precipitated with acetone, isolated by filtration, dried and dissolved in CCl$_4$. Proton NMR spectra confirmed the formation of 98% bis allyl-PIB. GPC showed a number average molecular weight of 3700.

EXAMPLE 2

Allylation of Isolated/Purified Chloro PIB

Chloro PIB was prepared by the semicontinuous inifer method of Kennedy et al. (J. Polym. Sci., Polm. Chem. Ed., 18, 1523 1980). Approximately 0.5 grams tertiary chloro-ended PIB was dissolved in 5 milliliters of dichloromethane and placed in a 50 milliliter glass reactor equipped with a Teflon stopcock. A three to five fold molar excess of allyltrimethylsilane relative to the tertiary chloro-end groups was added with a syringe under nitrogen. The reaction was initiated by adding a two to three fold molar excess of TiCl$_4$ Lewis acid with a syringe under nitrogen. The homogeneous charge was occasionally agitated and after 25–75 minutes was poured into saturated NaHCO$_3$ solution (25 milliliters). The organic phase was separated dried over anhydrous MgSO$_4$, and the volatiles were evaporated in vacuo. The polymer residue was dissolved in a small amount of hexane (approximately 2 milliliters), precipitated with acetone, separated, washed with acetone, and the volatiles were removed by evaporation in vacuo overnight. The dry polymer was dissolved in CCl$_4$ (20–30%) and subjected to proton NMR analysis which confirmed the formation of allyl PIB.

EXAMPLE 3

In Situ Allylation of Chloro PIB

Polymerization of isobutylene was carried out in a culture tube by rapidly adding 0.80 milliliters of BCl$_3$ to 22 milliliters of a stirred solution of 0.063 moles/dm$^3$ cumyl chloride and from 0.065 to 0.180 moles/dm$^3$ of allyltrimethylsilane and 1.2 moles/dm$^3$ of isobutylene. The reaction was terminated by the addition of a few milliliters of prechilled methanol and the precipitated allyl terminated PIB polymer was isolated.

EXAMPLE 4

"Two Reaction Vessel Two Step" TiCl$_4$ Catalyzed Allylation of Chloro PIB

Isobutylene (0.0224 moles) was polymerized at −80 degrees Centigrade for 60 minutes by passing it into 25 milliliters of a 80 parts methyl chloride and 20 parts hexane solution of 0.000562 moles of para-dicumyl chloride, 0.00308 moles BCl$_3$, in a culture tube. After one hour, the reaction was terminated and the chloro-PIB was isolated and washed to removed any residual BCl$_3$. The chloro-PIB, 1.0 gram, was then taken up in 10 milliliters of a solvent composition of 45:55 CH$_2$Cl$_2$:hexane. Four fold molar excesses (relative to the tertiary chloro groups of the cumyl chloride) of allyltrimethylsilane (0.00422 moles) and TiCl$_4$ (0.00236 moles) were simultaneously added at −80 degrees Centigrade. After 60 minutes the system was poured into a solution of saturated NaHCO$_3$(50 milliliters) at 0 degrees Centigrade. The allylated polymer was precipitated with acetone, isolated by filtration dried and dissolved in CCl$_4$. Proton NMR spectra confirmed the formation of bis allyl-PIB.

EXAMPLE 5

"Two Reaction Vessel Two Step" Diethyl Aluminum Chloride Catalyzed Allylation of Chloro PIB Isobutylene (0.0224 moles) was polymerized at −80 degrees Centigrade for 60 minutes by passing it into 25 milliliters of a 80 parts methyl chloride and 20 parts hexane solution of 0.00562 moles of para-dicumyl chloride, 0.00308 moles BCl$_3$, in a culture tube. After one hour, the reaction was terminated and the chloro-PIB was isolated and washed to removed any residual BCl$_3$. The chloro-PIB, 1.0 gram, was then taken up in 10 milliliters of a solvent composition of 45:55 CH$_3$Cl:hexane. Three fold molar excesses (relative to the tertiary chloro groups of the cumyl chloride) of allyltrimethylsilane (0.00314 moles) and diethylaluminum chloride (0.00218 moles) were simultaneously added at −80 degrees Centigrade. After 60 minutes the system was poured into 50 milliliters of a solution of saturated NaHCO$_3$ at 0 degrees Centigrade. The allylated polymer was precipitated with acetone, isolated by filtration, dried and dissolved in CCl$_4$. Proton NMR spectra confirmed the formation of bis allyl-PIB.

That which is claimed is:

1. A method of preparing allyl-terminated polyisobutylene polymer which method comprises reacting tertiary chlorinated polyisobutylene with allyltrimethylsilane in the presence of a Friedel-Crafts Lewis acid whereby allyl-terminated polyisobutylene polymer is produced.

2. A method of preparing allyl-terminated polyisobutylene polymer which method comprises reacting tertiary chlorinated polyisobutylene with allyltrimethylsilane in the presence of titanium tetrachloride and boron trichloride whereby allyl-terminated polyisobutylene polymer is produced.

3. A method of preparing allyl-terminated polyisobutylene polymer which method comprises reacting tertiary chlorinated polyisobutylene with allyltrimethylsilane in the presence of a metal halide selected from the group consisting of titanium tetrachloride, aluminum chloride, zirconium chloride, iron chloride, vanadium chloride, tin tetrachloride, and an alkyl aluminum chloride, wherein the alkyl group of the alkyl aluminum chloride has from one to six carbon atoms, whereby allyl-terminated polyisobutylene polymer is produced.

4. A method as described in claim 3 wherein the metal halide is titanium tetrachloride.

5. A method as described in claim 3 wherein the metal halide is aluminum chloride.

6. A method as described in claim 3 wherein the metal halide is tin tetrachloride.

7. A method as described in claim 3 wherein the metal halide is diethylaluminum chloride.

8. A method of preparing allyl-terminated polyisobutylene polymer which method comprises
(A) polymerizing isobutylene in a methyl chloride and hexane mixture, and in the presence of boron trichloride and an inifer wherein said inifer is selected from compounds having the following formula: AY$_n$, where A is selected from the group consisting of condensed and non-condensed aromatic compounds having from 1 to 4 rings, and linear and branched aliphatic compounds having from 3 to 20 carbon atoms, where Y is represented by the following formula:

where R and R$^1$ are independently selected from the group consisting of alkyl and aryl, and where X is a halogen selected from the group consisting of chlorine and bromine, and where n is an integer from 1 to 6;
(B) increasing the hexane concentration of the reaction mixture;
(C) allylating the polyisobutylene by adding an allyl-functional silane and titanium tetrachloride to the reaction mixture, wherein the allyl-functional silane is selected from the group consisting of compounds having the following formula

wherein R$^2$ and R$^3$ are independently selected from the group consisting of hydrogen and alkyl groups containing one to six carbon atoms;
(D) allowing the allylation reaction to proceed to completion;
(E) pouring the reaction mixture into an aqueous basic solution and,
(F) isolating and purifying the allyl-terminated polyisobutylene polymer.

9. An allyl-terminated polyisobutylene polymer produced by the method of claim 1.

10. An allyl-terminated polyisobutylene polymer produced by the method of claim 2.

11. An allyl-terminated polyisobutylene polymer produced by the method of claim 3.

12. An allyl-terminated polyisobutylene polymer produced by the method of claim 4.

13. An allyl-terminated polyisobutylene polymer produced by the method of claim 5.

14. An allyl-terminated polyisobutylene polymer produced by the method of claim 6.

15. An allyl-terminated polyisobutylene polymer produced by the method of claim 7.

16. An allyl-terminated polyisobutylene polymer produced by the method of claim 8.

17. A method as claimed in claims 1, 2, 3, or 8 wherein the tertiary chlorinated polyisobutylene is reacted with allyltrimethylsilane at a temperature in the range of −100 to 0 degrees Centigrade.

18. A method as claimed in claims 1, 2, 3, or 8 wherein the molar ratio of tertiary chlorinated polyisobutylene to allyltrimethylsilane is at most one/one.

19. A method as claimed in claim 8 wherein the hexane concentration of the reaction mixture is increased from 20 per cent to a concentration in the range of 55 to 70 weight per cent hexane.

* * * * *